Patented June 10, 1930

1,763,633

UNITED STATES PATENT OFFICE

NICHOLAS L. SIMMONS, OF WAUSAU, WISCONSIN

PROCESS OF MAKING WHEY PRODUCTS

No Drawing. Original application filed January 2, 1930, Serial No. 418,175. Divided and this application filed April 2, 1930. Serial No. 441,180.

The present invention relates to a process of making whey products, and is particularly concerned with the utilization of the whey which is a by-product in the manufacture of cheese and the like, resulting in the provision of an improved food product.

The disposal of the whey which is a by-product in manufacturing operations, such as the making of cheese and casein, has long been a serious problem for manufacturing establishments on account of the stench which is caused by the whey within a very short time after its production, and the undesirable pollution of the rivers and other streams where this by-product is discharged into neighboring streams.

While some methods have been practiced for the utilization of a small part of the whey, it is the universal practice in cheese and casein manufacturing establishments, to discharge the whey into sewers, streams or other bodies of water, because the whey has been an undesirable waste product.

One of the reasons for the universal wasting of the whey by-product, is the high cost of the complicated and expensive equipment which would be necessary to remove the solids from the whey, according to the spray methods of separation of the solids and the fact that the solids secured by the prior methods have been highly hygroscopic, so that they absorb moisture, forming a crust which is highly undesirable, and the solid products which have been produced by the methods of the prior art have not only been incapable of utilization in many cases, but have been so expensive that it was commercially more desirable to waste the whey than to utilize it.

One of the objects of the present invention is the provision of an improved food product having a high food content of lactose and other desirable food ingredients, which is also non-hygroscopic in its characteristics so that it may be kept in usable state for a long period of time without deterioration.

Another object is the provision of an unadulterated or substantially pure whey product of which substantially all of the lactose is in crystalline or hydrated form, thereby rendering the product substantially non-hygroscopic, so that it is capable of exposure to air and of being stored or shipped according to the ordinary methods of storing or shipping without deterioration and without caking, lumping, gumming or sticking like the whey products of the prior art. The terms "unadulterated" or "substantially pure" whey products are used throughout the present specification and claims to distinguish the present product from those other products to which it has been necessary to add undesirable extraneous ingredients in the process of manufacture.

Another object of the invention is the utilization of the whey resulting from the manufacture of cheese and from similar operations, in order to eliminate the problem of disposal of this waste by-product, and to make the whey an additional source of benefit rather than a waste.

Another object is the provision of an improved method of manufacture of food material from the whey, which may be practiced by the use of inexpensive equipment on a small scale or a large scale, thereby utilizing the waste by-product economically without the expenditure of a large investment in machinery or plants.

Another object is the production of a whole-whey product which is sufficiently non-hygroscopic to be capable of exposure to varied atmospheric conditions without deterioration, caking, lumping, etc. The term "whole-whey" product is used throughout the present specification and claims to distinguish the present products from other whey products, from which certain of the solids have been removed during the process of manufacture, so that said other whey products do not include all of the natural constituents of whey.

Another object is the production of a whole-whey product having substantially all of the non-volatile food materials present in the whey, including crystalline or hydrated lactose, whereby said product is sufficiently non-hygroscopic to be exposed to air without developing undesirable characteristics.

Another object is the provision of a simplified and economical process of manufacture of whey powder or solids, which may in many cases be practiced by the manufacturers of products which produce whey as a waste by-product, with equipment which they usually have at their disposal, with the slight additional expense of relatively inexpensive and simple equipment, thereby turning a waste product into a source of revenue without involving investment of a great deal of capital.

Another object is the provision of an improved food product of such a high quality that it is capable of utilization as an ingredient for human foods, as well as a relatively cheap food or medicinal agent for stock and poultry.

Another object is the provision of a process of manufacture of whey powder, which will produce a non-hygroscopic powder, capable of being preserved without possibility of lumping, crusting, or other deterioration.

Another object is the provision of an improved method of manufacture which produces a superior food product from the whey by-product resulting from cheese and casein manufacture.

Other objects and advantages of the invention will be apparent as the following description progresses, and it should be understood that the present invention includes not only the complete process, but the more simple processes and any of the sub-combinations of steps employed in my process.

The invention is of particular importance in the utilization of whey from the manufacture of cheese or casein, since the largest volume of whey is derived from such manufacture at the present time.

The present application relates particularly to one of the processes of making the whey product and is a division of my prior application Serial No. 418,157, filed January 2, 1930, for whey products and process of making the same.

The apparatus which is necessary to carry out the following process will be evident to one skilled in the art from a study of the process disclosed herein, and consequently it is not necessary to include a detailed description of the apparatus required.

The process for the utilization of the whey is described as follows:

Since the formation of lactic acid begins in the whey soon after its production in the manufacture of cheese, it is preferable that the whey be drawn directly from the cheese, through a cream separator to remove the fat, into the receptacles which are to be utilized in carrying out the present process.

In the case of the use of a skimmed milk whey, no further centrifuging is required, and in the case of a whole milk whey the step of fat separation is optional. Since a whole milk whey includes a higher percentage of butter fat, it will be evident that the finished product made without the separation of such butter fat will have a higher fat content, thereby materially increasing its nutritive properties, but the term "whole-whey" is generically applied to any of the types mentioned herein.

The first step in the process, where it is practical to transfer the whey directly to the vacuum pan, is the concentration of the whey by the removal of a large percentage of the moisture therefrom, and this step is preferably accomplished by means of a standard vacuum pan in which the whey is subjected to a vacuum and subjected to the influence of heat to evaporate the moisture.

Where it is not practical to draw off the whey from the cheese directly into the vacuum pan, the whey may be drawn off into a reservoir which insures a steady supply of whey for the operation of the vacuum pan, and if the whey is to be held for any time at all in the supply reservoir, such as for instance, one or two hours, it should preferably be maintained at a temperature of about 145° Fahrenheit and agitated by pumping or any other convenient method of agitation to retard the formation of lactic acid.

It should be noted that the purpose of the step of storage and agitation at the preferred temperature, is to insure the continuity of the process of manufacture, and while this step is of substantial commercial advantage, it may be eliminated by the arrangement of the apparatus so that whey may be drawn directly from the cheese to the vacuum pan, and in general, it is desirable that the whey be supplied to the vacuum pan as quickly and directly as possible.

The step of the concentration of the whey in the vacuum pan may be done in a single stage or "single effect," in which case I prefer to maintain the vacuum at substantially 22½ inches of mercury and the temperature at substantially 145° Fahrenheit, but it should be understood that higher temperatures may be utilized and temperatures as high as 165° have been employed with good results. In general, the lower temperature results in a whiter product, but temperatures lower than 145° cause a corresponding increase in the time required for the concentration of the whey and at temperatures much above 145° there is a tendency toward the burning of some of the ingredients which tends to discolor the resulting product so that the final product may be a light tan or a light brown in color, rather than the pure white powder which represents the best form of whey powder having the widest range of use for human food products, as well as stock feed.

The step of concentration is preferably accomplished in a two stage vacuum pan apparatus, also termed a "double effect" vacuum pan in which the vapors resulting from the first stage or "effect" are utilized for heating the product treated in a second stage or "effect." In such case, the first effect is preferably run at a vacuum of 12 inches of mercury or thereabouts, and 162° to 165° Fahrenheit, while the second stage or effect may be run at a vacuum of 22½ inches of mercury and substantially 145° Fahrenheit. The doubt effect vacuum pan apparatus has the advantage of a more economical utilization of the fuel employed, since the heated vapors from the first stage are utilized for heating the second stage. In general, the apparatus should preferably be operated at the lowest possible economical temperature, and the temperatures and pressure indicated should be regarded as exemplary of some of the temperatures which are capable of producing highly desirable results, but not exclusive of other temperatures which may be utilized by one skilled in the art.

The process of concentration of the whey in the vacuum pan is preferably continued until the action in the pan is very slow, and the completion of this step can be determined by one skilled in the art by watching the pan or by testing the concentrated whey with a Baumé hydrometer. The concentration is preferably continued until the resulting product is approximately seventy per cent solid and thirty per cent moisture, although the process may also be carried out at sixty-five per cent solid or as low as sixty per cent solid, but at such lower percentages of solids, I find that the concentrate does not solidify so well. A greater degree of concentration might be accomplished, but at percentages slightly greater than seventy per cent, it is found that in the next step of the process in the manufacture of the whey product, the material becomes too hard and tends to set in the pan, but at approximately seventy per cent solid, the concentrate is capable of setting to form a solid which is slightly mushy, but still capable of convenient removal from the setting reservoirs.

The next step in the process is the drawing off of the concentrated whey into a setting reservoir, where the whey is permitted to solidify or set, and this step at ordinary temperatures, requires a substantial period of time, such as a day. In the preferred practice of the process, the setting may be hastened by placing the concentrate in a reservoir which is subjected to refrigeration since it is found that cooling of the concentrate decreases the time required for setting.

The explanation of this setting action is that during the setting, certain ingredients of the concentrate, principally the lactose, undergo a process of crystallization, during which water of crystallization is taken into chemical composition with said ingredients. In other words, the lactose and the mineral constituents crystallize or become hydrated.

The presence of the non-hygroscopic characteristic in the finished whey product is explained by the fact that the whey product, made according to the present methods, has its lactose chemically combined with sufficient water to form crystalline structure which does not have an affinity for water like the amorphous whey products of the prior art, and the present product is therefore capable of being stored in ordinary sacks or open containers without caking, lumping, gumming, sticking or otherwise deteriorating. The whey products of the prior art could only be preserved by enclosure in hermetically sealed vessels.

The next step in the process of manufacture is the removal of the excess free moisture in the whey paste or its desiccation to such a point that the resulting product is a substantially dry solid. In order to increase the exposed air surface of the solids and to expedite the drying process, the whey preferably is spread or separated into smaller particles, pieces or sheets and placed in some receptacle or upon some support which subjects the greatest amount of solids to the influence of the moisture absorbing atmosphere. One method of accomplishing this result is to force the mushy solids through a screen, the particles falling upon another supporting screen. The latter support with the solid material is subjected to a current of dry and heated air to remove the excess moisture from the solids.

In one form of the apparatus the solids rest upon a screen carried by frames, and the frames are placed in ordinary ovens or drying tunnels, while in another form of apparatus designed for continuous operation the solids may be placed upon a screen belt which passes through an oven, tunnel or tube, and is subjected to a current of hot or dry air. In the latter case, the set whey product may be extruded through a slot to form a sheet as mentioned above, the sheet being deposited upon the moving belt. In the preferred form of apparatus adapted to expedite the manufacture as much as possible, the air may be pre-dried by cooling the air to condense excess moisture after which the air is heated to increase its capacity for absorbing moisture and for drying the whey solids.

The drying operation should be accomplished at a temperature below the temperature at which the water of crystallization would be driven off. Crystalline or hydrated lactose ordinarily gives up its water of crystallization at a temperature of 268° Fahrenheit. In general the lowest temperature which is capable of economical operation should be used. While the preferred temperature is about 140 degrees Fahrenheit, higher temperatures may be used up to the temperature at which the water of crystallization is driven off, but beyond the preferred temperature the material caramelizes or forms a molasses or sticky mass which is incapable of being ground or handled satisfactorily in making the present product. Higher temperatures also result in discoloration of the finished product, so that while the preferred temperature represents the most desirable temperature, it is not to be regarded as critical but merely as exemplary of one of the desired temperatures at which the drying operation should be accomplished.

The drying operation should be continued until the product no longer is soft, but is dry and brittle and suitable for breaking up or grinding. In general, the length of time required for the drying operation is indicated by the appearance and feel of the product and its action in the grinding machine. The screens which are used may be of any size capable of suporting the particles of solid whey, but $\frac{1}{16}$ to $\frac{1}{8}$ inch mesh have been found satisfactory at the preferred temperatures indicated above.

The product resulting from such a drying operation is a crystalline or flaky structure consisting of relatively small pieces of whey solids which may in some cases be utilized in such form for manufacture of other food products or for feed. In order to place the material in better form for mixing with other food products and for use as a stock feed, the hand screen frames preferably are shaken over a hopper, or the belt screen is so arranged as to discharge the dried solids into a hopper of a grinding mill which reduces the solids to a powder or to such a predetermined size or particle as is desirable for the use to which it is intended to be put.

The food product resulting from the foregoing process comprises a crystalline whey powder which is non-hygroscopic in character so that the powder does not tend to absorb moisture from the air as has been the case with the products of the prior art. Consequently, the powder may be stored in bags, or any convenient type of receptacle, and it may be kept for long periods of time without deterioration.

The present method produces a food product which will dissolve as readily as ordinary hygroscopic powder, and it may be mixed readily with all kinds of food ingredients as a filler or a flavor. When used as a feed for poultry, it is found that the whey product is capable of preventing coccidiosis or dysentery, and it is highly desirable as a food for stock or chickens on account of the desirable regulatory effect on the digestive organs. The whey food product is an effective appetizer, and has the beneficial properties of the mineral salts of milk and also the high food value on account of the presence of lactose and other food ingredients which were otherwise wasted by the dumping of the whey.

One exemplary analysis of one of the products of the process which will indicate the food ingredients present is as follows:

| | Per cent |
|---|---|
| Lactose (crystalline or hydrated) | 76 |
| Protein | 12 |
| Fat | 0.5 |
| Ash | 7.5 |
| Lactic acid | 0.14 |
| Moisture (free) to make 100%, i. e. | 3.86 |

Other uses for the whey powder are the use of the powder as a filler in the manufacture of cheese and other food products, since the whey powder has a high food value, and it also may be utilized for seasoning food products or imparting a distinctive flavor thereto. The powder resulting from the preferred practice of the method is a practically pure white powder which does not include the undesirable burnt products or discolorations of the products of the prior art.

Another advantage lies in the fact that the article can be more conveniently transported, handled and fed, and present practice of hauling back rancid whey in the farmer's can is eliminated so that the cleaning of the cans may be accomplished at the factory where sterilizing apparatus is available, thereby insuring a better grade of cream for butter.

The apparatus required for carrying out the process is extremely simple and very economical on account of the fact that any system employing vacuum pans is inherently more economical than the spray systems, and since the system includes a vacuum pan, it generally can be carried out with existing apparatus with the mere addition of the apparatus for accomplishing the drying and grinding operations. The space required for such apparatus is very small, thereby effecting great economy over the usual apparatus required for spray methods, and the present process has the advantage of flexibility, since it can be installed easily in a small plant with a small vacuum pan, but it is also capable of large volume operation with a minimum expenditure of money for machine and plant.

While I have illustrated and described the preferred method of carrying out the process and the most desirable product resulting from such a preferred method, it should be understood that I do not wish to be limited to all of the details of the exact methods described, but desire to avail myself of all changes within the scope of the appended claims.

Having thus described my invention, what I claim is new and desire to secure by Letters Patent of the United States is:

1. The process of manufacture of a whey product comprising the removal by evaporation of a large percentage of the water content of the whey at a low temperature to avoid discoloration of the product, causing the concentrated whey to set whereby the lactose crystallizes, and drying the resulting product in a moisture absorbing atmosphere below the temperature which effects the removal of the water of crystallization from lactose.

2. The process of manufacture of a whey product comprising the removal by evaporation of a large percentage of the water content of the whey, causing the concentrated whey to set whereby the lactose crystallizes, and drying the resulting product in a moisture absorbing atmosphere at a temperature below the temperature which effects removal of the water of crystallization from lactose.

3. The process of manufacture of a whey product comprising the removal by evaporation of a large percentage of the water content of the whey, permitting the concentrated whey to set whereby the lactose crystallizes, drying the resulting product in a moisture absorbing atmosphere at a temperature below the temperature which effects removal of the water of crystallization, and pulverizing the resulting whey product to a predetermined degree of comminution.

4. The process of manufacture of a whey product comprising the removal by evaporation of a large percentage of the water content of the whey, causing the concentrated whey to set whereby the lactose crystallizes, spreading the set whey product to increase the drying surface and subjecting the spread whey product to a moisture absorbing atmosphere of a temperature below that which effects removal of the water of crystallization.

5. The method of utilization of the whey by-product of cheese or the like comprising transferring whey directly to a concentrating device, concentrating the whey to substantially seventy per cent solids and thirty per cent moisture at a temperature of about 145° Fahrenheit, subjecting the concentrated whey to cooling to effect crystallization, spreading the crystallized whey to expedite drying, drying the resulting product at a temperature below the temperature of removal of water of crystallization and grinding the resulting solid to a powder.

6. The process of making a whey product which consists in removing a sufficiently large percentage of the water content of the whey to induce crystallization on setting, and permitting the resulting product to set for a sufficient length of time to effect crystallization of lactose and to form a substantially homogeneous pasty mass.

7. The process of making a whey product which comprises removing a sufficiently large percentage of the water content of the whey to induce crystallization on setting, permitting the resulting product to set for a sufficient length of time to effect crystallization of lactose and to form a substantially homogeneous pasty mass, and further reducing the free water content of said mass by dehydration to form a substantially dry crystalline whey product.

8. The process of making a whey product comprising permitting a concentrated aqueous whey preparation to set to a pasty mass, wherein the lactose is present in crystalline form and dehydrating the resulting product at a temperature below that which effects removal of water of crystallization from the lactose.

9. The process of making a whey product comprising permitting a concentrated aqueous whey preparation to set to a pasty mass, wherein the lactose is present in crystalline form, dehydrating the resulting product at a temperature below that which effects removal of water of crystallization from the lactose, and pulverizing the substantially dry product to a predetermined degree of comminution.

10. The process of making a whole-whey product consisting in concentrating the whey to substantially seventy percent solids and thirty percent moisture in a vacuum pan, removing the resulting concentrate to a setting reservoir and permitting said concentrate to set until the lactose crystallizes.

11. The process of making a whole-whey product consisting in concentrating the whey to substantially seventy percent solids and thirty percent moisture in a vacuum pan, removing the resulting concentrate to a setting reservoir and subjecting said concentrate to refrigeration to expedite crystallization of the lactose to a pasty homogeneous mass.

12. The process of making a whole-whey product consisting in concentrating the whey to substantially seventy percent solids and thirty percent moisture in a vacuum pan at a low temperature to avoid discoloration of the product, removing the resulting concentrate to a setting reservoir and permitting said concentrate to set until the lactose crystallizes.

13. The process of making a whole-whey product consisting in concentrating the whey to substantially seventy percent solids and thirty percent moisture in a vacuum pan at a temperature of substantially 145° Fahrenheit, removing the resulting concentrate to a setting reservoir, and permitting said concentrate to set until the lactose crystallizes.

14. The process of making a whole-whey product comprising concentrating the whey to substantially seventy percent solids and thirty percent moisture in a vacuum pan at a low temperature to avoid discoloration of the product, removing the resulting concentrate to a setting reservoir, permitting said concentrate to set until the lactose crystallizes into a pasty mass, and desiccating said pasty mass at a temperature below the temperature at which the crystalline lactose caramelizes.

15. The process of making a whole-whey product comprising concentrating the whey to substantially seventy percent solids and thirty percent moisture in a vacuum pan at a low temperature to avoid discoloration of the product, removing the resulting concentrate to a setting reservoir, permitting said concentrate to set until the lactose crystallizes into a pasty mass, extruding said pasty mass upon a support and drying said mass at a temperature below the temperature at which discoloration of the resulting product takes place.

16. The process of making a whole-whey product comprising concentrating the whey to substantially seventy percent solids and thirty percent moisture in a vacuum pan at a low temperature to avoid discoloration of the product, removing the resulting concentrate to a setting reservoir, permitting said concentrate to set until the lactose crystallizes into a pasty mass, extruding said pasty mass upon a moving support, drying said mass to a brittle state, and pulverizing the brittle whey solids to form a powder.

In witness whereof, I hereunto subscribe my name this 31st day of March, 1930.

NICHOLAS L. SIMMONS.